(12) United States Patent
Iga

(10) Patent No.: US 6,226,740 B1
(45) Date of Patent: May 1, 2001

(54) INFORMATION PROCESSING APPARATUS AND METHOD THAT USES FIRST AND SECOND POWER SUPPLIES FOR REDUCING BOOTING TIME

(75) Inventor: Kazuhisa Iga, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/216,610

(22) Filed: Dec. 21, 1998

(30) Foreign Application Priority Data

Dec. 19, 1997 (JP) .................................................. 9-350771

(51) Int. Cl.[7] .................................................. G06F 9/445
(52) U.S. Cl. .................................................. 713/2
(58) Field of Search .................................................. 713/2

(56) References Cited

U.S. PATENT DOCUMENTS 5,568,641 * 10/1996 Nelson et al. ............................ 713/2
6,061,788 * 5/2000 Reynaud et al. ........................ 713/2
6,115,814 * 9/2000 Lieber et al. ............................ 713/2

FOREIGN PATENT DOCUMENTS

| 62-242257 | 10/1987 | (JP) . |
| 3-14153 | 1/1991 | (JP) . |
| 4-170647 | 6/1992 | (JP) . |
| 8-161176 | 6/1996 | (JP) . |

\* cited by examiner

Primary Examiner—Thomas M. Heckler
(74) Attorney, Agent, or Firm—Foley & Lardner

(57) ABSTRACT

A host controller performs a centralized controlled over the operation of an information processing apparatus as a whole. Codes which are read out for booting the information processing apparatus are stored in a ROM in advance. The host controller copies the contents of the ROM into a high speed storage element and reads out the storage contents of the high speed storage element to boot the apparatus when a $V_{CC}$ power supply is turned on after the $V_{CC}$ power supply is once turned off. This allows the apparatus to be booted based on the contents read out from the high speed storage element which can be read much faster than the ROM.

3 Claims, 2 Drawing Sheets

INFORMATION PROCESSING APPARATUS AND METHOD THAT USES FIRST AND SECOND POWER SUPPLIES FOR REDUCING BOOTING TIME

BACKGROUND OF THE INVENTION

1. Field of the Invention

The present invention relates to an information processing apparatus and a method for booting the same. More particularly, the present invention relates to an information processing apparatus having a first power supply for supplying power only in a normal operating state and a second power supply for supplying power not only in a normal operating state but also in a power supply off state and a method for booting the same.

2. Description of the Related Art

In some information processing apparatuses such as personal computers, codes for a basic input/output system (BIOS) to serve as an interface between the operating system(OS) and the hardware are stored in a read only memory (ROM). In such an information processing apparatus, the BIOS codes are read from the ROM when the apparatus is booted.

Such a conventional information processing apparatus has a problem in that a long time is spent before the apparatus is booted because the BIOS codes stored in the ROM are read at a low speed and hence the user must spend wasteful time until the apparatus is booted.

SUMMARY OF THE INVENTION

It is an object of the present invention to provide an information processing apparatus which can be booted at a high speed and a method for booting the same.

It is another object of the invention to provide an information processing apparatus whose booting time can be reduced with an inexpensive configuration and a method for booting the same.

An information processing apparatus according to the present invention comprises:
   a processor;
   a storage device;
   a first power supply;
   a host controller connected to the processor, the host controller reading out codes stored in the storage device to boot the apparatus when the first power supply is turned on;
   a high speed storage element which can be read out at a speed higher than that for the storage device;
   a second power supply for supplying power to each of the host controller and the high speed storage element at all times whether the first power supply is turned on or turned off; and
   a controller for reading out codes stored in advance in the high speed storage element having the same storage contents as those in the storage device to boot the apparatus when the first power supply is turned on.

According to the present invention, there is provided a method for booting an information processing apparatus in which a host controller connected to a processor reads codes stored in a storage device to boot the apparatus when a first power supply is turned on, comprises the steps of:
   supplying power from a second power supply to each of a high speed storage element which can be read out at a speed higher than that for the storage device and the host controller at all times whether the first power supply is on or off; and
   reading out codes stored in advance in the high speed storage element having the same storage contents as those in the storage device to boot the apparatus when the first power supply is turned on.

According to the present invention, since booting is performed by reading out codes stored in advance in the high speed storage element having the same contents as those in the storage device when the first power supply is turned on, the time required for booting can be significantly reduced compared to the related art.

Further, according to the present invention, the storage contents of the high speed storage element are cleared during the period from a system terminating operation until the time at which the first power supply is turned off as a result of the system terminating operation; thereafter, a process is performed to copy the codes used for booting read out from the storage device into the high speed storage element and set a write protect therein; and, when the first power supply is turned on again thereafter, booting is carried out using the codes read out from the high speed storage element and the write protect is cancelled. Since this makes it possible to use an existing high speed storage element for booting, the present invention can be carried out at a low cost without the need for additional components.

DETAILED DESCRIPTION OF PREFERRED EMBODIMENTS

Figure 1:
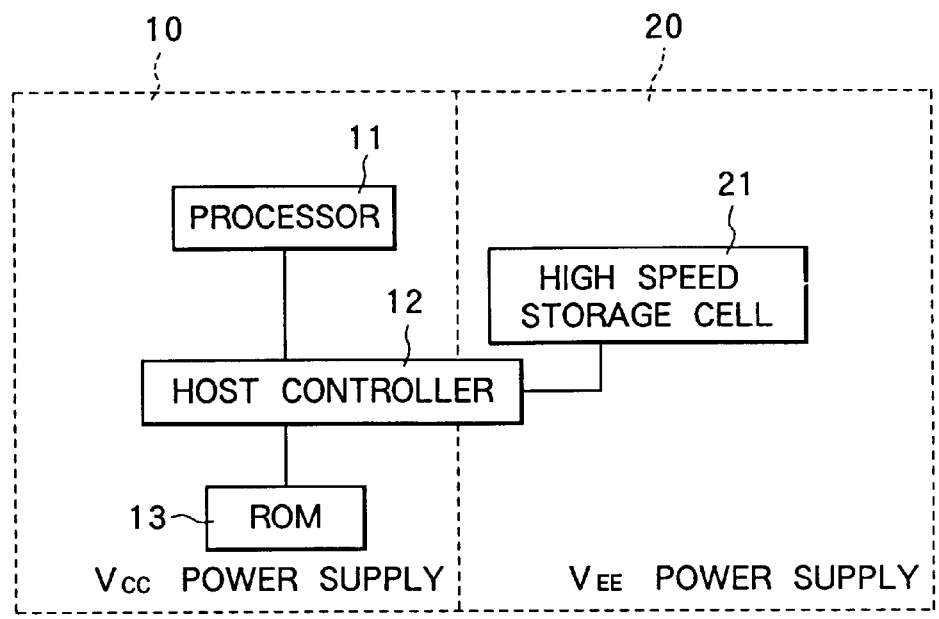
FIG. 1 is a configuration diagram showing the principle of the present invention.

Preferred embodiments of the present invention will now be described specifically with reference to the accompanying drawings. FIG. 1 is a block diagram of a first embodiment of the present invention. Referring to FIG. 1, an information processing apparatus according to the embodiment of the present invention comprises a processor 11, a host controller 12, a read only memory (ROM) 13 which is a storage device, and a high speed storage element 21. The processor 11, host controller 12 and ROM 13 are provided in a $V_{CC}$ power supply circuit 10 to which power is supplied from a $V_{CC}$ power supply as a first power supply only in a normal operating state.

The host controller 12 and high speed storage element 21 are provided in a $V_{EE}$ power supply circuit 20 to which power is supplied from a $V_{EE}$ power supply as a second power supply not only in a normal operating state but also when the $V_{CC}$ power supply is off. That is, power is supplied to the host controller 12 from both of the $V_{CC}$ and $V_{EE}$ power supplies.

The host controller 12 carries out centralized control over the operation of the information processing apparatus as a whole. Codes to be read to boot the information processing apparatus are stored in the ROM 13 in advance. Codes having the same storage contents as those stored in the ROM 13 are stored in advance in the high speed storage element 21 which is configured such that it can be read out at a much higher speed than the ROM 13. According to the present invention, the storage contents of the high speed storage element 21 are read out to boot the apparatus when the $V_{CC}$ power supply is turned on after the $V_{CC}$ power supply is once turned off.

Further, according to the present invention, when a booting mode is set at a high speed mode during a normal operation for which the first power supply $V_{CC}$ is on, the storage contents of the high speed storage element 21 are cleared during the period from a system terminating operation until the time at which the first power supply $V_{CC}$ is turned off as a result of the system terminating operation under the control of the host controller 12. Thereafter, a process is performed to copy the codes used for booting read out from the ROM 13 into the high speed storage element 21 and set write protect therein. When the first power supply $V_{CC}$ is turned on again thereafter, booting is carried out using the codes read out from the high speed storage element 21 and the write protect is cancelled. This makes it possible to use an existing high speed storage element for booting.

Figure 2:
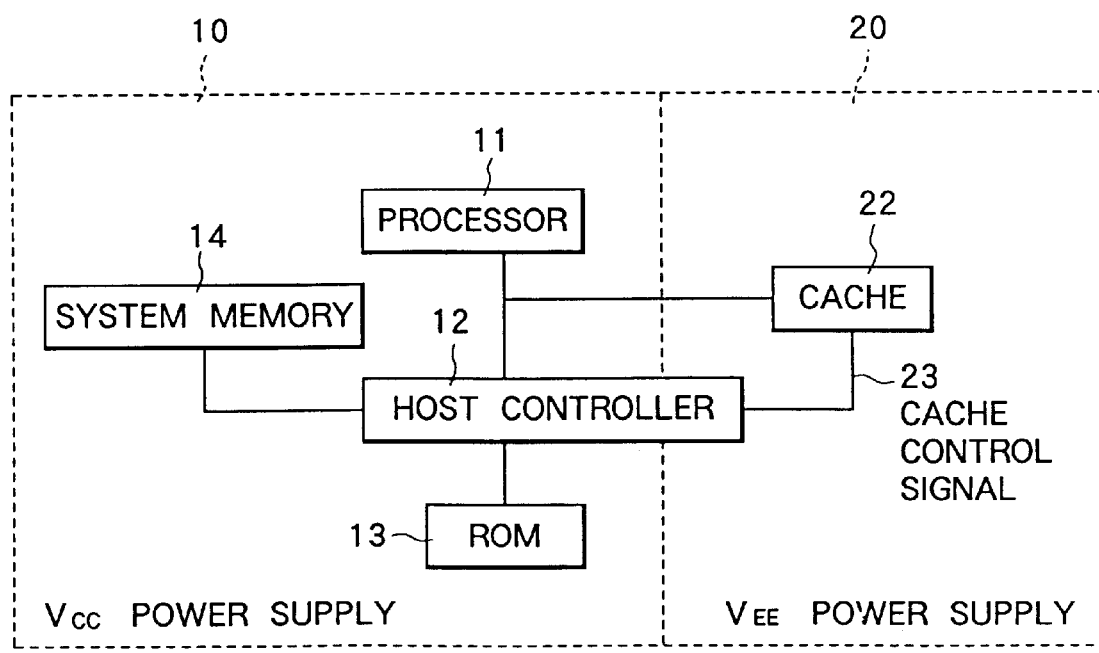
FIG. 2 is a block diagram of an embodiment of the present invention.

A second embodiment of the present invention will now be described. FIG. 2 is a block diagram of an information processing apparatus according to the second embodiment of the present invention. In FIG. 2, components identical to those in FIG. 1 are indicated by same reference numbers. Referring to FIG. 2, the information processing apparatus comprises a processor 11, a host controller 12, a ROM 13, a system memory 14 and a cache memory (hereinafter referred to as "cache") 22.

The processor 11, the host controller 12, the ROM 13 and the system memory 14 are provided in a $V_{CC}$ power supply circuit 10 to which power is supplied from a $V_{CC}$ power supply only in a normal operating state. The host controller 12 and cache 22 are provided in a $V_{EE}$ power supply circuit 20 to which power is supplied from a $V_{EE}$ power supply not only in a normal operating state but also when the $V_{CC}$ power supply is off. The cache 22 is a memory which is an example of the high speed storage element 21, and write and read operations on the same is controlled by the host controller 12. The same storage contents as those stored in the system memory 14 are stored in the cache 22 during a normal operation.

Figure 3:
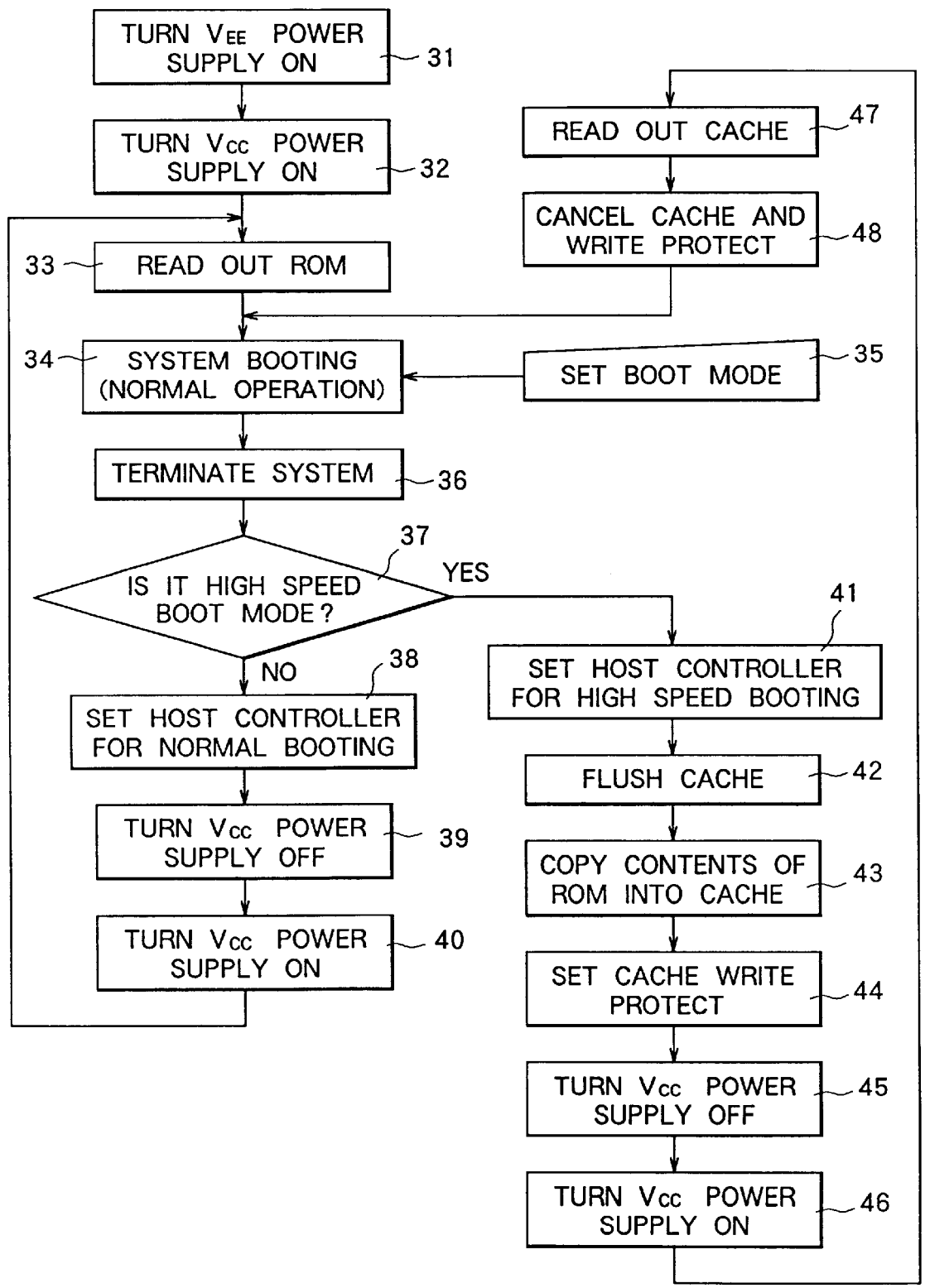
FIG. 3 is a flow chart illustrating the operation of the embodiment shown in FIG. 2.

The operation of the present embodiment will now be described with reference to the flow chart in FIG. 3. In the information processing apparatus of the present embodiment, a $V_{EE}$ power supply is first turned on (step 31) to supply power to each of the host controller 12 and the cache 22 not only in a normal operating state but also when the power supply to the information processing apparatus is off, thereby putting them in an operating state at all times. Then, the $V_{CC}$ power supply is turned on (step 32). Since this is the beginning of the use of the apparatus and a system boot mode has not been set by the user yet, the storage contents of the ROM 13 (BIOS codes) are read out in a default state (step 33).

This puts the information processing apparatus in a normal operating mode after booting (step 34) in which the user sets a boot mode (step 35). The present embodiment has a normal boot mode in which the storage contents of the ROM 13 are read out for booting and a high speed boot mode in which the storage contents of the cache 22 are read out for booting.

If the user chooses to terminate the system thereafter (step 36), it is determined which boot mode has been set (step 37). If the user has set the normal mode described above, the host controller 12 is set such that it reads out the contents of the ROM 13 when booting is carried out (step 38). Therefore, the $V_{CC}$ power supply is turned off as a result of system termination (step 39). When the $V_{CC}$ power supply is turned on again later to use the apparatus (step 40), the host controller 12 reads out the storage contents of the ROM 13 for booting (steps 33, 34).

In the case that the user has set the above-described high speed mode in the normal operating state, if the user chooses to terminate the system (step 36) and it is determined that the high speed mode has been set for the host controller 12(step 37), the host controller 12 is set in the high speed mode (step 41).

Thereafter, the $V_{CC}$ power supply is turned off when the system is terminated. Since the contents of the system memory 14 have been written into the cache 22 until that time through a normal operation, the cache 22 is flushed to clear the storage contents (step 42) and, thereafter, the storage contents (BIOS codes) of the ROM 13 are copied to the cache 22 of the host controller 12 (step 43). In order to maintain the copied contents, the host controller 12 provides a write protect by adding a cache control signal 23 (step 44) during writing. The system is terminated after the process described above and, as a result, the $V_{CC}$ power supply is turned off (step 45).

When the $V_{CC}$ power supply is turned on again to use the apparatus later (step 46), the host controller 12 reads out the storage contents (BIOS codes) of the cache 22 (step 47), cancels the write protect in the cache 22 with the cache control signal 23 when the reading-out is complete to enable the cache 22 to start operating as a normal cache (step 48) and boots the system (step 34). Thus, the apparatus starts a normal operation.

As described above, booting is carried out using the contents of the cache 22 which can be read out at a high speed instead of the contents of the ROM 13 which is read out at a lower speed. This makes it possible to reduce the apparatus boot time significantly compared to the related art.

In addition, an existing cache 22 which has been provided in an information processing apparatus is used as the high speed storage element 21 to be used for increasing the reading-out speed of the BIOS codes. This eliminates the need for any external additional circuit and therefore the need for additional components, which allows inexpensive configurations.

Since the cache 22 is required to have the memory of the codes having the same storage contents of the ROM 13 when the $V_{CC}$ power supply is turned on after the $V_{CC}$ power supply is once turned off, it may be a dedicated memory in which the codes having the same storage contents of the ROM 13 are stored in advance.

What is claimed is:

1. An information processing apparatus comprising:

a processor;

a storage device;

a first power supply coupled to the processor and the storage device;

a host controller connected to said processor and said first power supply for reading out basic input/output system codes stored in said storage device to boot the apparatus when said first power supply is turned on;

a high speed storage element which can be read out at a speed higher than that for said storage device wherein said high speed storage element is a cache memory used during a normal operation for which said first power supply is on and wherein said host controller copies the codes used for booting read out from said storage device into said high speed storage element during the period from a system terminating operation at the host controller until the time said first power supply is turned off, sets a write protect thereafter, reads the codes used for booting from said cache memory when said first power supply is turned on and cancels said write protect thereafter; and a second power supply for supplying power to each of said host controller and said high speed storage element at all times whether said first power supply is on or off; and wherein said host controller reads out BIOS codes stored in advance in said high speed storage element having the same storage contents as those in said storage device to boot the apparatus when said first power supply is turned on.

2. A method for booting an information processing apparatus in which a host controller connected to a processor reads out basic input/output system codes stored in a storage device to boot the apparatus when a first power supply is turned on, said method comprising the steps of:

supplying power from a second power supply to each of a high speed storage element which can be read out at a speed higher than that for said storage device and said host controller at all times whether said first power supply is on or off; and reading out BIOS codes stored in advance in said high speed storage element having the same storage contents as those in said storage device to boot the apparatus when said first power supply is turned on; and performing booting based on the codes used for booting read out from said storage device in a default state when said first power supply is initially turned on; and copying the codes used for booting read from said storage device into said high speed storage element immediately before said first power supply is turned off only when a high speed boot mode is set during a subsequent normal operation.

3. A method for booting an information processing apparatus, in which a host controller connected to a processor reads out basic input/output system codes stored in a storage device to boot the apparatus when a first power supply is turned on, said method comprising the steps of:

supplying power from a second power supply to each of a high speed storage element which can be read out at a speed higher than that for said storage device and said host controller at all times whether said first power supply is on or off; and reading out BIOS codes stored in advance in said high speed storage element having the same storage contents as those in said storage device to boot the apparatus when said first power supply is turned on;

wherein if a boot mode is set at the high speed mode during a normal operation for which said first power supply is on;

the storage contents of said high speed storage element are cleared in the period from a system terminating operation until the time at which said first power supply is turned off as a result of said system terminating operation;

a process is performed thereafter to copy the codes used for booting read out from said storage device into said high speed storage element and to set a write protect further; and booting is performed using the codes read out from said high speed storage element and said write protect is canceled when said first power supply is turned on again thereafter.

* * * * *